May 3, 1927.
J. B. VOGLER
1,627,130
ROTATABLE DISPLAY STAND
Filed June 19, 1924   2 Sheets-Sheet 1
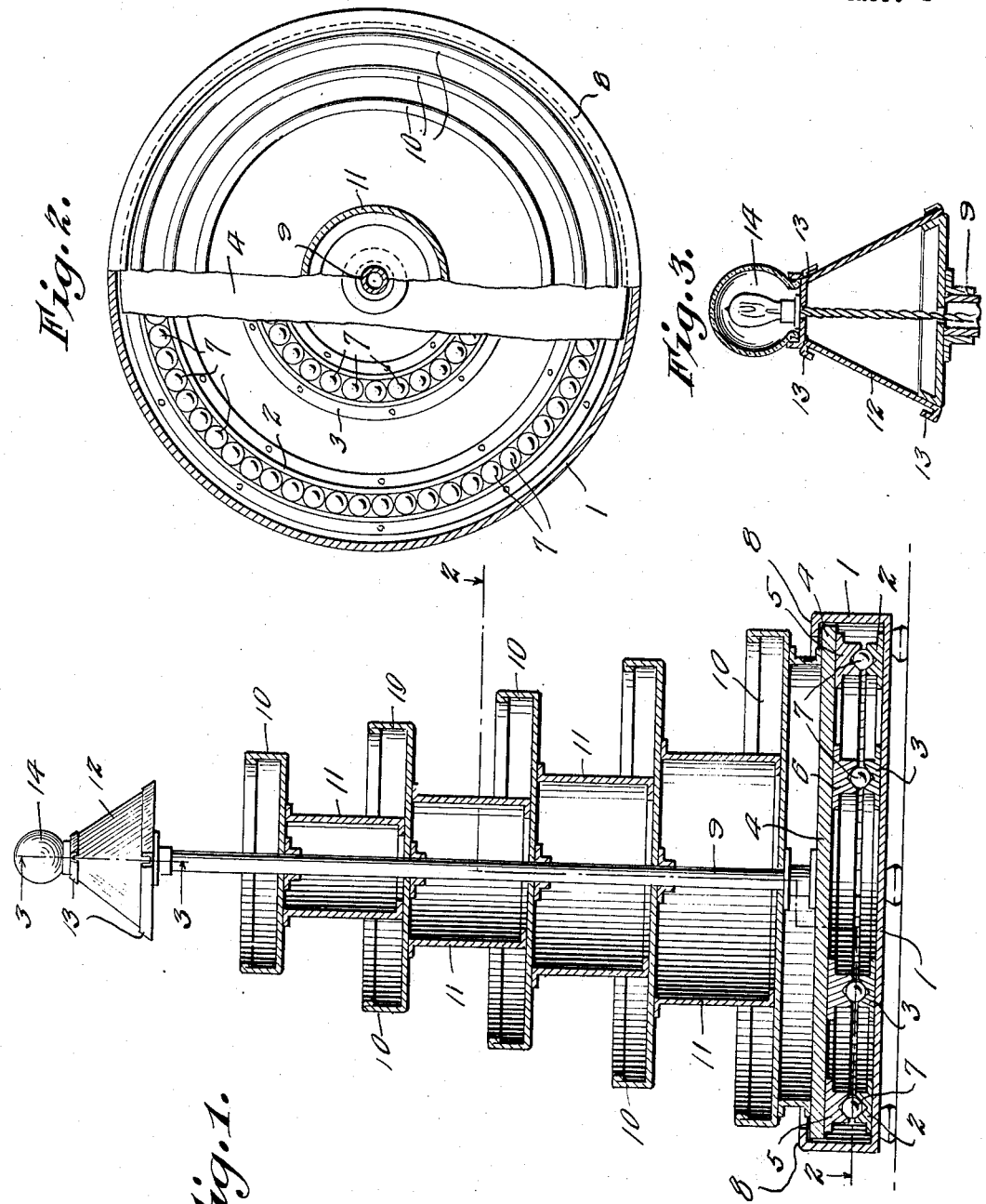
Inventor
James B. Vogler
By Lester L. Sargent
Attorney May 3, 1927.

J. B. VOGLER 1,627,130

ROTATABLE DISPLAY STAND

Filed June 19, 1924    2 Sheets-Sheet 2

Inventor
James B. Vogler
By Lester L. Sargent
Attorney

Patented May 3, 1927.

UNITED STATES PATENT OFFICE.

JAMES B. VOGLER, OF CHARLOTTE, NORTH CAROLINA.

ROTATABLE DISPLAY STAND.

Application filed June 19, 1924. Serial No. 721,121.

The object of my invention is to provide a novel rotatable stand for the display of preserves, groceries, etc., and to provide novel means for continuously rotating the stand. I attain the objects of my invention by the device illustrated in the accompanying drawings, in which—

Figure 1 is a vertical section through my invention, partly in elevation;

Fig. 2 is a horizontal section on line 2—2 of Fig. 1;

Fig. 3 is a vertical section on line 3—3 of Fig. 1;

Like numerals designate like parts in each of the several views.

Figure 5:
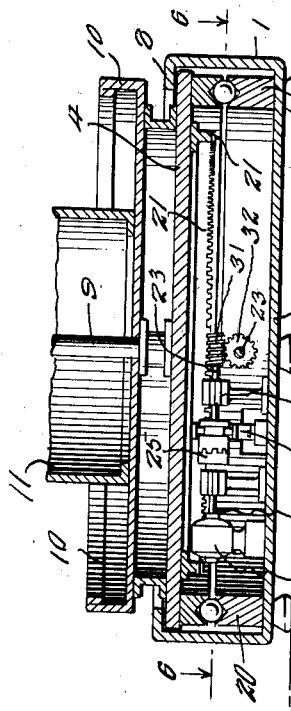
Fig. 5 is a detail vertical sectional view of electrically driven operating means for rotating the stand.

Referring to the accompanying drawings, I provide a suitable base 1 having ball races 2 and 3 carrying the ball bearings 7 which ride in the inverted ball races 5 and 6 of rotatable stand floor 4. Base 1 is provided with the horizontal flange 8 extending over floor 4, as shown in Fig. 1. Rigidly mounted on rotatable floor 4 is a hollow standard 9. Mounted on the upper end of standard 9 is a suitable lamp support 12 carrying lamp 14. I provide circular flanges 13 on the member 12 to which display cards or signs or price-tags may be attached. Mounted on the floor 4 is a suitable preferably circular tray 10 above which are a series of other trays 10 of graded and gradually diminishing sizes. These trays are spaced apart from each other by the supporting members 11, as shown in Fig. 1. Both of the trays 10 are provided with annular flanges which may be either upturned (as shown in the drawings) or downturned, if preferred. Lamp 14 contains an incandescent bulb, the electric light wire to same being carried through the hollow standard 3 and casing 12, as shown in Fig. 3.

Figure 6:
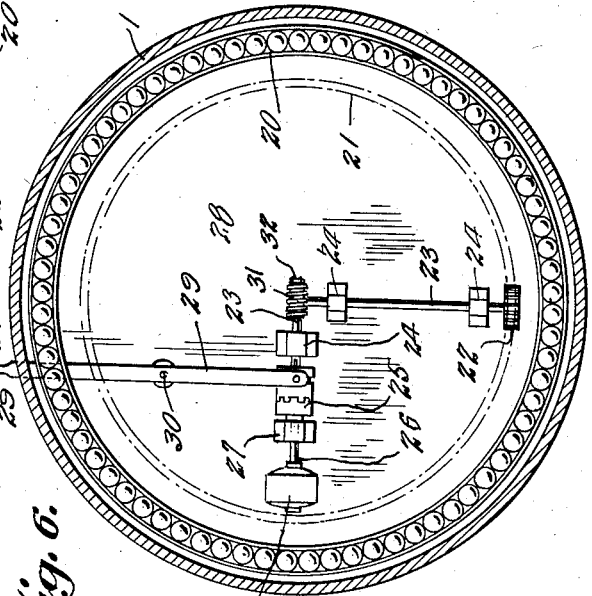
Fig. 6 is a horizontal section on line 6—6 of Fig. 5.
Figure 4:
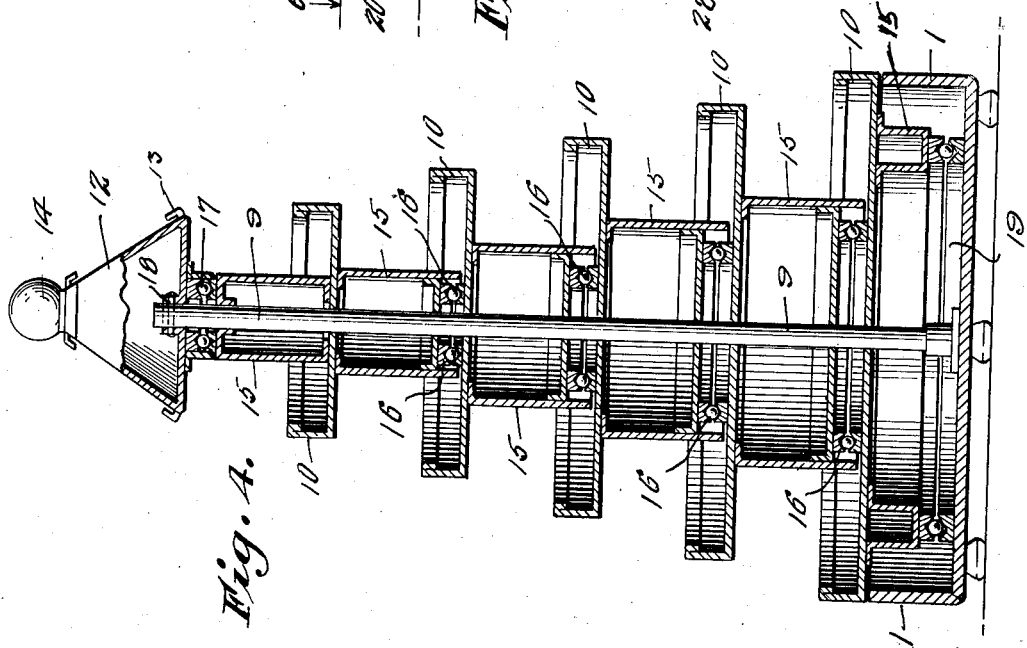
Fig. 4 is a vertical section through a modified form of my invention.

Referring to the modified form of my invention shown in Figs. 4, 5 and 6, I provide a similar display stand which, however, is provided with a series of ball races and ball bearings designated as 16, arranged between each of the several shelves 10 and their supports 15; and I also provide similar ball races and ball bearings 17, between the lamp support and the uppermost member 15, as shown in Fig. 4. I may provide means for continuously rotating both of the stands disclosed in Figs. 1 and 4, such as is illustrated in Fig. 5, consisting of a suitable electric motor 28 positioned under the floor 4 and on the base 1 and driving the shaft 26 which is mounted in a suitable bearing 27 and through suitable reducing gears 31 and 32, in turn driving the shaft 23 which is mounted in bearings 24 and carries the gear 22 which meshes with the ring gear 21 affixed to floor 4, as shown in Fig. 5. I may also provide a suitable clutch 25 operated by clutch lever 29 which is mounted on pivot 30, as shown in Fig. 6. Motor 28 is electrically connected with any ordinary electric light socket in a conventional manner.

The stands may be of any desired height and width and may have their trays 10 of any suitable shape such as round, square, triangular, octagon, pyramidal or oblong, and may be provided with any suitable braces or reinforcements necessary to give the stand the needed strength. Each shelf may independently revolve on roller bearings, as shown in Fig. 4 or the entire series of shelves may be affixed to each other and all be rotatable together relative to the base, as shown in form illustrated in Fig. 1. I provide suitable oil holes on the upper side of every set of roller bearings. The stand is primarily intended for window display purposes.

What I claim is:

1. In a rotatable display stand, the combination of a base, a floor rotatably mounted on the base, a hollow cylindrical tube mounted on the floor and through which electric conductors may be carried in concealed position, said tube being adapted to support an electric lamp on the top of the tube, a series of trays of graded sizes having annular upturned flanges, said trays gradually decreasing in size tier by tier toward the top of the stand, a series of cylindrical supports, the respective trays and cylindrical supports being rotatable relative to the hollow cylindrical tube which supports the lamp, a ring gear affixed to said floor device, and means operatively connected with said ring gear for rotating the floor and trays.

2. In a rotatable display stand, the combination of a base, a floor rotatably mounted on the base, a hollow cylindrical tube mounted on the floor and through which electric conductors may be carried in concealed position, said tube being adapted to support an electric lamp mounted on the top of the tube, a series of trays of graded sizes having annular upturned flanges, said trays gradually decreasing in size tier by tier toward the top of the stand, a series of cylindrical supports, the respective trays and cylindrical supports being independently rotatable relative to the hollow cylindrical tube which supports the lamp, a ring gear affixed to said floor device, and means operatively connected with said ring gear for rotating the floor and trays.

JAMES B. VOGLER.